United States Patent [19]
Martel, Jr.

[11] Patent Number: 5,202,034
[45] Date of Patent: Apr. 13, 1993

[54] APPARATUS AND METHOD FOR REMOVING WATER FROM AQUEOUS SLUDGES

[76] Inventor: Courtland J. Martel, Jr., R.R. 2, Box 372 (Bud Mil Rd.), Enfield, N.H. 03748

[21] Appl. No.: 729,303

[22] Filed: Jul. 12, 1991

[51] Int. Cl.$^5$ .................. B07D 33/048; B07D 33/58
[52] U.S. Cl. .................. 210/770; 210/774; 210/783; 210/784; 210/184; 210/400; 210/402
[58] Field of Search .............. 210/770, 774, 783, 784, 210/184, 185, 186, 258, 259, 400, 401, 402, 324, 335

[56] References Cited

U.S. PATENT DOCUMENTS

| | | | |
|---|---|---|---|
| 2,736,434 | 2/1956 | Yacoe | 210/184 |
| 2,889,931 | 6/1959 | Buttolph | 210/184 |
| 3,039,610 | 6/1962 | Black | 210/184 |
| 3,317,052 | 5/1967 | Davis | 210/400 |
| 3,338,411 | 8/1967 | von der Gathen et al. | 210/184 |
| 3,614,873 | 10/1971 | Cole et al. | 210/774 |
| 3,864,258 | 2/1975 | Richardson et al. | 210/186 |
| 4,008,158 | 2/1977 | Davis | 210/400 |
| 4,027,400 | 6/1977 | Erickson | 210/774 |
| 4,427,157 | 1/1984 | Klein | 210/400 |

FOREIGN PATENT DOCUMENTS 3604616 8/1987 Fed. Rep. of Germany.
8808388 11/1988 PCT Int'l Appl..

*Primary Examiner*—Stanley S. Silverman
*Assistant Examiner*—Christopher Upton

[57] ABSTRACT

An apparatus for dewatering aqueous sludge is disclosed. A porous drum is partially immersed in a sludge pond. A porous belt is connected between the drum and a roller which moves the belt. As the belt moves, the sludge adheres to the belt. A vacuum is drawn on the interior of the drum, removing some of the water. Sludge which is conveyed on the belt is frozen as it approaches the roller. The frozen sludge is broken into smaller cakes as it leaves the roller. The frozen cakes are subsequently dethawed providing a solid residue which is disposed.

11 Claims, 1 Drawing Sheet

DEWATERING APPARATUS

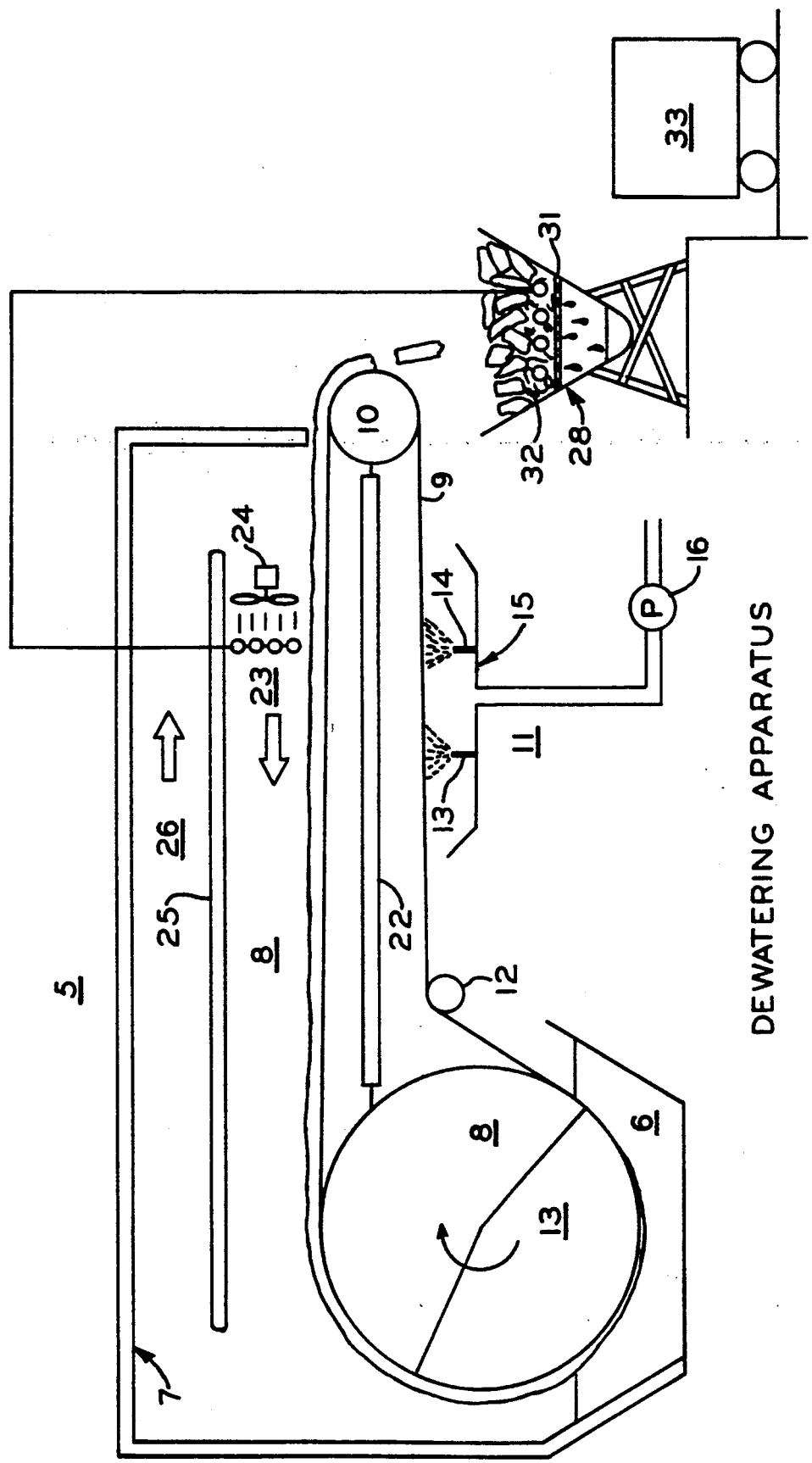

APPARATUS AND METHOD FOR REMOVING WATER FROM AQUEOUS SLUDGES

The present invention relates to dewatering processes for removing water from waste sludge. Specifically, a technique for dewatering aqueous sludges by prefiltering most of the water from the sludges and then freezing is described.

Conventional water-treating processes for rendering water suitable for drinking produces a quantity of solid particles in water which forms a sludge. During operation of the water treatment plant, it is periodically necessary to dispose of this sludge. To remove the sludges for disposal purposes, the sludges are dewatered and the solid particles transported to a landfill.

The extent of dewatering impacts significantly on the transportation and disposal costs. As a result, numerous techniques have been employed to remove as much of the water from the sludges as possible before transporting them to the landfill.

In some applications, these techniques include a belt press which conveys the suspension of solid particles and clear water through a press. The water is removed by pressing the material, leaving the solid material on the belt. However, these processes have not been entirely satisfactory. As an alternative, it has been proposed to freeze and thaw the sludge. It has been found that by freezing and then thawing the sludge, it is possible to increase the solid content from 1% to 30% by weight of the entire sludge mixture.

Devices for freezing and thawing sludges have their drawbacks as well. There is a high cost associated with freezing large volumes of dilute sludge. The size of the devices and the amount of energy needed in order to freeze large quantities of these materials make them impractical in many situations.

It is recognized that the costs of freezing these aqueous sludges can be reduced by approximately $\frac{1}{2}$ by doubling the solids content. Any steps which can be taken to prefilter the sludge to remove some of this water will therefore provide a beneficial cost saving.

SUMMARY OF THE INVENTION

It is an object of this invention to preprocess aqueous sludge before freeze-thawing the sludge.

It is a more specific object of this invention to incorporate pre-processing steps in a freeze-thaw operation for removing a higher percentage of water from the aqueous sludge.

These and other objects are provided by an apparatus and method in accordance with the invention.

In carrying out the invention, a perforated drum is supported in a sludge chamber containing the aqueous sludge. A dry roller is supported at a distance away from the perforated drum. A belt is connected between the roller and perforated drum. An insulated housing is placed around substantially the entire periphery of the suspended belt, perforated drum and roller. An exit opening in the housing is provided to permit discharge of the sludge.

As a pre-processing step, a vacuum is drawn on the interior of the perforated drum. Any sludge adhering to the suspended porous belt is partially dewatered by virtue of the vacuum being drawn against the perforated belt and the sludge adhering to the outside of the belt.

Along the span of the belt a freezing chamber is provided to freeze the partially dewatered sludge attached on the belt. The belt speed and span of the belt is adjusted so that sludge which has accumulated on the belt, on its way from the perforated drum to the roller and adjacent exit, is frozen. The frozen sludge caked on the perforated belt breaks into smaller pieces as it moves over the roller. These smaller pieces are discharged through the exit opening into a hopper or collection chamber.

In a preferred embodiment of the invention, a collection chamber is provided at the exit of the housing to catch the frozen sludge cakes as they exit the housing The collection chamber includes a porous bottom having a coarse screen supporting a plurality of thawing coils. The thawing coils melt the sludge cakes, allowing the moisture contained in the cakes to drain away. The remaining solid particles in the collection chamber can be conveniently removed to a landfill.

DESCRIPTION OF THE FIGURE

The figure illustrates a section view of a dewatering apparatus in accordance with a preferred embodiment of the invention.

DESCRIPTION OF THE PREFERRED EMBODIMENT

Referring now to the Figure, there is shown a section view of a dewatering apparatus which employs freeze-thawing apparatus for removing the water from the aqueous sludge. The device 5 includes an insulated housing 7, partially enclosing a porous belt 9 supported between a dry roller 10 and porous drum 8. An idler pulley 12 guides the porous belt as it enters sludge chamber 6.

Partially immersed in the sludge chamber 6 is a drum 8 having a porous exterior surface. The drum 8 is configured such that a vacuum may be drawn within a sector 13 on the interior thereof. As the belt moves clockwise about the drum 8, which may be stationary or rotational in other embodiments, the sludge coats the porous belt. The porous belt experiences a vacuum due to the perforations in the exterior of a portion of the drum 8. This portion of the drum 8 within sector 13 is connected to a vacuum pump in order to draw a vacuum against the porous belt which becomes coated with sludge material. The vacuum effectively filters some of the water from the sludge adhering to the porous belt. Removal of the water from the sludge during this pre-processing step improves the ability to freeze large quantities of sludge in a second processing step carried out by the dewatering apparatus.

The second step carried out by the apparatus of the Figure includes freezing the partially dewatered sludge as it approaches the roller 10. The roller 10 is positioned at an exit of the insulated housing such that sludge moving over the dry roller 10 is discharged from the housing. The roller 10 may be heated internally in order to assist in separating the frozen sludge from the porous belt.

In freezing the partially dewatered sludge, a freezing coil 23 and fan 24 are shown for directing a freezing airstream over the accumulated sludge on the belt 9. A freezing chamber 17 is formed between the belt 9 and an insulated baffle 25. The baffle 25 defines a cold air return chamber 26 as well as the freezing chamber 17. An insulating baffle 22 on the opposite side of the belt 9 additionally assists in maintaining the temperature along the belt 9 low enough to freeze the sludge.

As was earlier noted, a reduction in water content will reduce the amount of energy needed to freeze the sludge. The pre-processing step of drawing a vacuum against the porous belt before freezing permits the size of the freezing unit 23 and fan 24, as well as the necessary energy to effect freezing to be reduced to practical limits.

As a further processing step, a washing section 11 is shown supporting two water jets 13, 14. As the sludge cakes are broken into smaller chunks and deposited in a sludge collection hopper 28, the returning belt 9 is washed with the stream of water to remove a minor amount of solid material remaining on the porous belt 9. The washing station 11 is connected through a conduit and pump 16 to permit the water and any minor amounts of solid material to be pumped to the head end of the water treatment plant where it may be added to the water supply being treated.

The frozen chunks may be further processed to reduce the water content therein. The hopper 28 includes a coarse screen 31 supporting thawing coils 32. The thawing coils 32 may be part of the freezing unit 23, dissipating the heat removed by the freezing unit 23. By melting the frozen sludge cakes it is possible to further reduce the water content of the materials which must be transported to the landfill. The sludge hopper 28 may be tiltable so that once the melt water has been drawn off through an outlet, not shown, the materials may be deposited in a truck 33 for transport to the landfill. The various steps for dewatering the sludge material before transport to the landfill reduces the cost of disposing of the material.

Thus, there has been illustrated with respect to the Figure, one embodiment of an apparatus for dewatering aqueous sludge in accordance with the invention described in the claims which follow.

What is claimed is:

1. An apparatus for dewatering aqueous sludges comprising:
    a sludge chamber containing aqueous sludges;
    a perforated drum supported in said sludge chamber;
    a vacuum chamber on the inner side of said drum, drawing a vacuum against at least a portion of said drum outer surface;
    a roller supported for rotation at an exit opening in said sludge chamber;
    a porous belt formed as a loop about said drum and said roller, said belt being tensioned to move with rotation of said roller, said belt being coated with sludge as it traverses the outer circumference of said rotating drum, while said vacuum chamber removes a substantial amount of water from said sludge;
    a freezing coil located along said porous belt for freezing said sludge coating said belt as it travels toward said roller; and,
    a hopper disposed below said exit opening for receiving frozen sludge conveyed by said roller.

2. The freeze separator of claim 1 wherein said hopper comprises a collection chamber having a coarse screen supporting a plurality of thawing coils, said thawing coil generating heat for melting said chunks so that additional moisture is removed through said screen.

3. The freeze separator of claim 2, wherein said thawing coils receive heat removed by said freezing coil.

4. The freeze separator of claim 1 further comprising a washing station located along said porous belt for washing said belt as it approaches said drum.

5. The freeze separator of claim 1 further comprising a internal heater positioned to heat said roller, wherein said frozen sludge breaks as said belt traverses said roller.

6. A method for dewatering aqueous sludge comprising:
    partially immersing a porous drum in a sludge chamber;
    suspending a porous belt about said drum, and about a drive roller positioned near an exit of said sludge chamber, whereby sludge accumulates on said porous belt;
    drawing a vacuum on the interior of said rotating drum, whereby moisture is removed from accumulated sludge to the interior of said drum; and,
    freezing sludge accumulated on said porous belt as it approaches said exit, thereby further reducing the moisture in said sludge.

7. The method for dewatering aqueous sludges according to claim 6, further comprising:
    supporting said sludge cakes exiting said sludge chamber on a screen; and, thawing said sludge cakes so that water passes through said screen while solid materials remain supported above said screen.

8. The method for dewatering aqueous sludge according to claim 6 further comprising washing said porous belt as it approaches said rotating drum to remove any residual particles on said belt.

9. The method of claim 6 comprising the further step of heating said sludge as it passes over said roller, whereby said sludge breaks into smaller frozen sludge cakes.

10. The method of claim 9 wherein said step of freezing further comprises the step of providing a freezing coil.

11. The method of claim 10 wherein said step of heating further comprises the step of heating said sludge using the reclaimed heat removed by said freezing coil.

* * * * *